(12) United States Patent
Morimoto et al.

(10) Patent No.: US 7,808,466 B2
(45) Date of Patent: Oct. 5, 2010

(54) TRANSFLECTIVE LIQUID CRYSTAL DISPLAY DEVICE

(75) Inventors: Masateru Morimoto, Mobara (JP); Toshio Miyazawa, Chiba (JP); Shoichi Hirota, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 1003 days.

(21) Appl. No.: 11/592,964

(22) Filed: Nov. 6, 2006

(65) Prior Publication Data

US 2007/0103626 A1 May 10, 2007

(30) Foreign Application Priority Data

Nov. 7, 2005 (JP) ............... 2005-322049

(51) Int. Cl.
*G09G 3/36* (2006.01)
*G02F 1/1335* (2006.01)
(52) U.S. Cl. ......................... 345/87; 349/114
(58) Field of Classification Search ................ 349/114; 345/87–103
See application file for complete search history.

(56) References Cited

U.S. PATENT DOCUMENTS

| 5,847,687 | A | 12/1998 | Hirakata et al. | |
|---|---|---|---|---|
| 6,914,656 | B2 * | 7/2005 | Sakamoto et al. | 349/141 |
| 7,064,802 | B2 * | 6/2006 | Lin | 349/141 |
| 7,088,409 | B2 * | 8/2006 | Itou et al. | 349/114 |
| 2002/0001867 | A1 | 1/2002 | Sung et al. | |
| 2004/0252261 | A1 | 12/2004 | Wen | |
| 2005/0083462 | A1 | 4/2005 | Lin | |
| 2005/0140870 | A1 | 6/2005 | Kim et al. | |
| 2006/0256264 | A1 * | 11/2006 | Yang et al. | 349/114 |
| 2007/0002226 | A1 | 1/2007 | Sakamoto | |

FOREIGN PATENT DOCUMENTS

| JP | 10-031464 | 2/1998 |
|---|---|---|
| JP | 2001-194685 | 7/2001 |
| JP | 2003-344837 | 12/2003 |
| KR | 10-2005-0068880 | 7/2005 |

\* cited by examiner

*Primary Examiner*—Amare Mengistu
*Assistant Examiner*—Steven E Holton
(74) *Attorney, Agent, or Firm*—Antonelli, Terry, Stout & Kraus, LLP.

(57) ABSTRACT

The present invention provides an IPS-type transflective liquid crystal display device in which a contrast is not inverted between a transmissive portion and a reflective portion. The transflective liquid crystal display device includes a liquid crystal display panel having a pair of substrates and liquid crystal which is sandwiched between the pair of substrates, wherein the liquid crystal display panel includes the plurality of sub pixels each of which includes a transmissive portion and a reflective portion, each sub pixel of the plurality of sub pixels includes a pixel electrode which is formed on one substrate out of the pair of substrates and a counter electrode which is formed on the one substrate, and an electric field is generated between the pixel electrode and the counter electrode thus driving the liquid crystal. Further, each sub pixel is configured such that the pixel electrode is formed in common with respect to the transmissive portion and the reflective portion and the counter electrode is formed independently with respect to the transmissive portion and the reflective portion.

16 Claims, 12 Drawing Sheets

TRANSFLECTIVE LIQUID CRYSTAL DISPLAY DEVICE

The present application claims priority from Japanese application JP 2005-322049 filed on Nov. 7, 2005, the content of which is hereby incorporated by reference into this application.

BACKGROUND OF THE INVENTION

The present invention relates to a transflective liquid crystal display device, and more particularly to an IPS-type transflective liquid crystal display device.

A transflective liquid crystal display device which has a transmissive portion and a reflective portion within one sub pixel has been used as a display for a portable digital assistant.

Such a transflective liquid crystal display device adopts a vertical electric field method in which an electric field is applied to liquid crystal sandwiched between a pair of substrates in the direction perpendicular to planes of the pair of substrates thus driving the liquid crystal. Further, to make the characteristic of the transmissive portion and the reflective portion match each other, a stepped portion is provided between the transmissive portion and the reflective portion, and a phase difference plate is arranged between a polarizer and a liquid crystal layer.

As a type of liquid crystal display device, there has been known an IPS-type liquid crystal display device. In this IPS-type liquid crystal display device, pixel electrodes (PX) and counter electrodes (CT) are formed on the same substrate, and an electric field is generated between the pixel electrodes (PX) and the counter electrodes (CT) so as to rotate the liquid crystal in a plane of the substrate thus controlling a contrast. Accordingly, the IPS-type liquid crystal display device has the characteristic that the gradation of a display image is not inverted even when a screen is viewed obliquely.

To make use of this characteristic, the constitution of the transflective liquid crystal display device using the IPS-type liquid crystal display device has been proposed in JP-A-2003-344837 (patent document 1), for example.

Further, as a driving method of the IPS-type liquid crystal display device, driving of counter electrodes for every display line is described in JP-A-2001-194685 (patent document 2) and JP-A-10-31464 (patent document 3), for example.

SUMMARY OF THE INVENTION

However, as described in the patent document 1, in constituting the transflective liquid crystal display device using the IPS-type liquid crystal display device, when the transmissive portion assumes a normally black mode, the reflective portion assumes a normally white mode thus giving rise to a drawback that a contrast is reversed between the transmissive portion and the reflective portion.

The present invention has been made to overcome the above-mentioned problems of the conventional technique and it is an advantage of the present invention to provide an IPS-type liquid crystal display device which can prevent a contrast from being reversed between a transmissive portion and a reflective portion.

The above-mentioned and other advantages and novel features of the present invention will become apparent by the description of this specification and attached drawings.

To briefly explain the summary of typical invention among inventions disclosed in this specification, they are as follows.

(1) The present invention is directed to a transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion.

(2) The present invention is directed to a transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and in the inside of the each sub pixel, a potential which is applied to the counter electrode of one of the transmissive portion and the reflective portion is a potential higher than a potential which is applied to the pixel electrode, and a potential which is applied to the counter electrode of another of the transmissive portion and the reflective portion is a potential lower than the potential which is applied to the pixel electrode.

(3) The present invention is directed to a transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and the transmissive portion has normally-black characteristic which performs a black display in a state that a voltage is not applied, and the reflective portion has normally-white characteristic which performs a white display in a state that a voltage is not applied.

(4) The present invention is directed to a transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and the counter electrodes are independently driven for every 1 display line.

(5) The present invention is directed to a transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and assuming that two neighboring display lines are constituted of one display line and another display line, reference voltages which differ from each other are applied to the counter electrodes of the transmissive portions of the respective sub pixels on the one display line and the counter electrodes of the reflective portions of the respective sub pixels on the one display line, and a same reference voltage is applied to the counter electrodes of the reflective portions of the respective sub pixels on the one display line and the counter electrodes of the transmissive portions of the respective sub pixels on the another display line.

(6) The present invention is directed to a transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and assuming that two neighboring display lines are constituted of one display line and another display line, reference voltages which differ from each other are applied to the counter electrodes of the transmissive portions of the respective sub pixels on the one display line and the counter electrodes of the reflective portions of the respective sub pixels on the one display line, a same reference voltage is applied to the counter electrodes of the reflective portions of the respective sub pixels on the one display line and the counter electrodes of the transmissive portions of the respective sub pixels on the another display line, and the counter electrodes are driven independently for every 1 display line.

(7) In the constitution (5) or (6), the counter electrode in the reflective portion in the each sub pixel on the one display line and the counter electrode in the transmissive portion in the each sub pixel on the another display line are formed of a common electrode.

(8) In any one of the constitutions (1) to (7), the pixel electrodes in the transmissive portion and the pixel electrodes in the reflective portion differ from each other in an interval of electrodes.

(9) In any one of the constitutions (1) to (8), the pixel electrode in the reflective portion is made of metal which exhibits the reflectance of 70% or less.

(10) In any one of the constitutions (1) to (8), the pixel electrode in the reflective portion is formed of a transparent electrode, the reflective portion includes a reflective film, and the reflective film has a slit at position where the slit is overlapped to the pixel electrode in the reflective portion.

(11) In any one of the constitutions (1) to (8), another substrate out of the pair of substrates has a light blocking film at a position where the another substrate faces the pixel electrode in the reflective portion in an opposed manner.

(12) In anyone of the constitutions (1) to (11), the counter electrode is formed of a strip-like electrode, an interlayer insulation film which is formed on the counter electrode of the strip-like electrode, and the pixel electrode is formed on the interlayer insulation film.

(13) In anyone of the constitutions (1) to (12), assuming n as an integer of 1 or more, in synchronism with the writing of a video voltage to the pixel electrodes in the nth display line, a same reference voltage is applied to the counter electrodes of the reflective portions in the nth display line and the counter electrodes of the transmissive portions in the (n+1)th display line.

(14) In anyone of the constitutions (1) to (12), assuming n as an integer of 1 or more, in synchronism with the writing of a video voltage to the pixel electrodes in the nth display line, a same reference voltage is applied to the counter electrodes of the transmissive portions in the nth display line and the counter electrodes of the reflective portions in the (n+1)th display line.

(15) In anyone of the constitutions (1) to (12), assuming n as an integer of 1 or more, in synchronism with the writing of a video voltage to the pixel electrodes in the nth display line, a same reference voltage is applied to the counter electrodes of the reflective portions in the (n+1)th display line and the counter electrodes of the transmissive portions in the (n+2)th display line.

(16) In anyone of the constitutions (1) to (12), assuming n as an integer of 1 or more, in synchronism with the writing of a video voltage to the pixel electrodes in the nth display line, a same reference voltage is applied to the counter electrodes of the transmissive portions in the (n+1)th display line and the counter electrodes of the reflective portions in the (n+2)th display line.

Here, the constitutions (1) to (16) merely constitute one example and the present invention is not limited by these constitutions.

To briefly explain advantageous effects obtained by typical inventions among the inventions disclosed in this specification, they are as follows.

According to the present invention, it is possible to provide an IPS-type transflective liquid crystal display device in which a contrast is not inverted between the transmissive portion and the reflective portion.

DESCRIPTION OF THE PREFERRED EMBODIMENTS

Embodiments according to the present invention are explained hereinafter in conjunction with drawings.

Here, in all drawings for explaining the embodiments, parts having identical functions are given same numerals and their repeated explanation is omitted.

Embodiment 1

Figure 1:
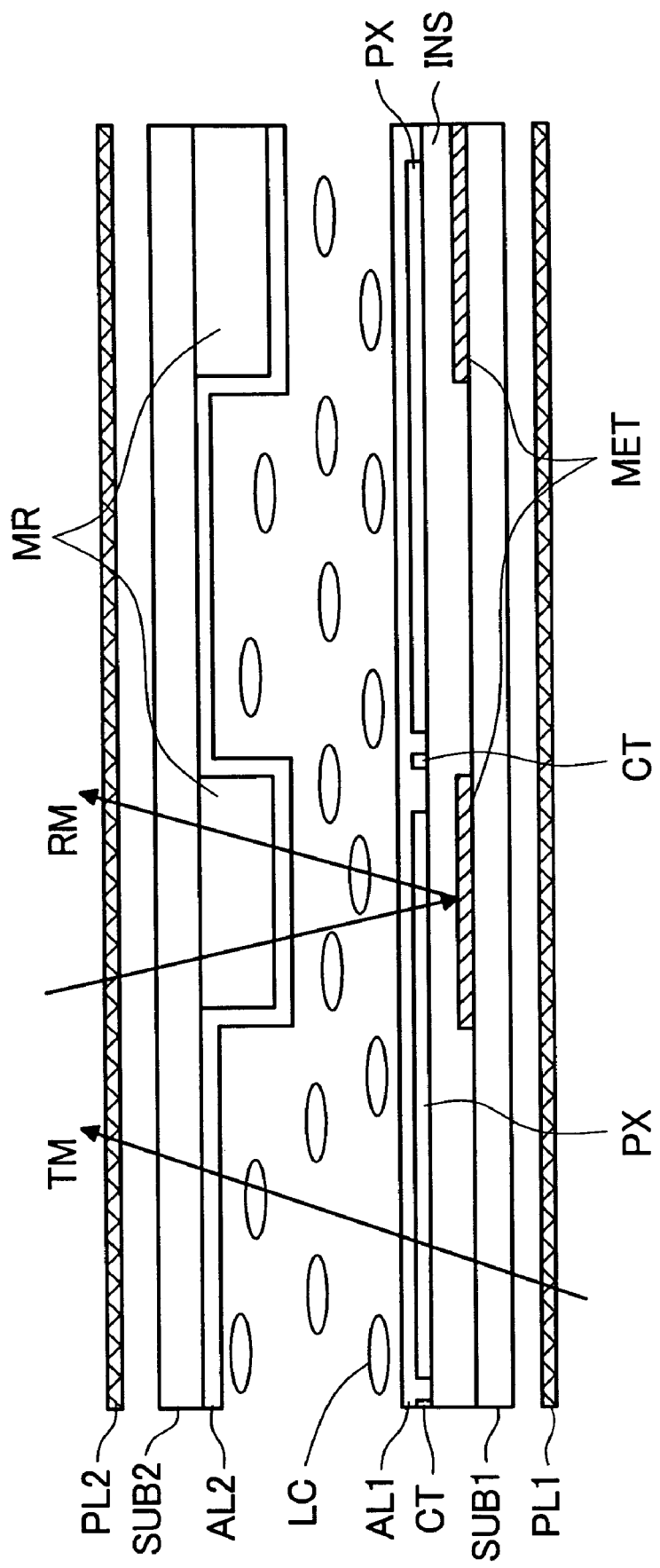
FIG. 1 is a cross-sectional view of an essential part showing the schematic constitution of a sub pixel of a transflective liquid crystal display device according to an embodiment 1 of the present invention.
Figure 2:
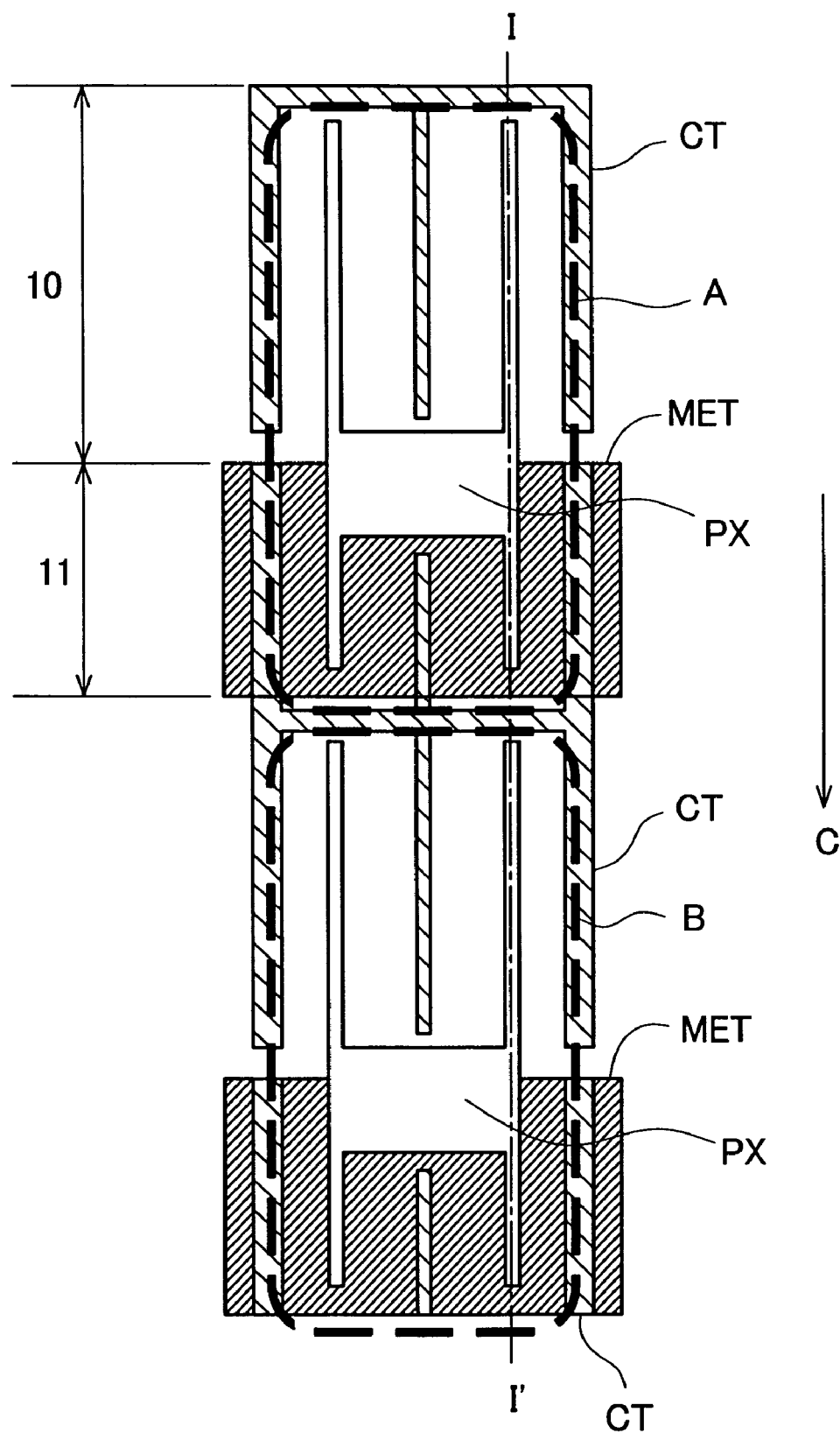
FIG. 2 is a plan view showing the electrode structure of the sub pixel of the transflective liquid crystal display device according to the embodiment 1 of the present invention.

FIG. 1 is a cross-sectional view of an essential part showing the schematic constitution of a sub pixel of a transflective liquid crystal display device according to an embodiment 1 of the present invention, while FIG. 2 is a plan view showing the electrode structure of the sub pixel of the transflective liquid crystal display device according to the embodiment 1 of the present invention. Here, FIG. 1 is a cross-sectional view taken along a line I-I' in FIG. 2.

Hereinafter, the transflective liquid crystal display device of this embodiment is explained in conjunction with FIG. 1 and FIG. 2.

As shown in FIG. 1, in this embodiment, a pair of glass substrates (SUB1, SUB2) are provided in a state that a liquid crystal layer (LC) is sandwiched between the pair of glass substrates (SUB1, SUB2).

On one glass substrate (SUB1), for example, a reflective layer (MET) made of Al, an interlayer insulation film (INS) which is formed on the reflective layer (MET), pixel electrodes (PX) and counter electrodes (CT) which are formed on the interlayer insulation film (INS), and an orientation film (AL1) which is formed on the pixel electrodes (PX) and the counter electrodes (CT) are formed. Here, the interlayer insulation film (INS) may be formed of two or more layers.

Further, another glass substrate (SUB2) is provided with a step forming layer (MR) and an orientation film (AL2) which is formed on the step forming layer (MR).

Further, outside the glass substrates (SUB1, SUB2), polarizers (PL1, PL2) are arranged. Here, in FIG. 1, symbol TM indicates light of a transmissive portion and RM indicates light of a reflective portion.

Here, a region where the reflective layer (MET) and the step forming layer (MR) are formed constitutes the reflective portion 11, and other regions constitute the transmissive portion 10.

Further, as shown in FIG. 2, the pixel electrodes (PX) and the counter electrodes (CT) are respectively formed in a comb-teeth shape, wherein respective comb-teeth portions of the pixel electrodes (PX) and the counter electrodes (CT) are formed at predetermined pitches to be meshed with each other. Here, in FIG. 2, portions which are respectively indicated by dotted frames A, B respectively indicate 1 sub pixel.

Here, in FIG. 1, FIG. 2 and other corresponding drawings, although an active matrix is constituted of a plurality of scanning lines, a plurality of video lines which intersect a plurality of scanning lines, and active elements (for example, thin film transistors) which are formed corresponding to respective pixels, such a constitution is omitted from the drawings. Further, although contact holes and color filters are also formed when necessary, these parts are also omitted from the drawings. Further, although the counter electrodes (CT) are electrically connected with the counter electrodes (CT) of a sub pixel of a neighboring column not shown in the drawings, the connection structure is also omitted from the drawings.

Figure 11:
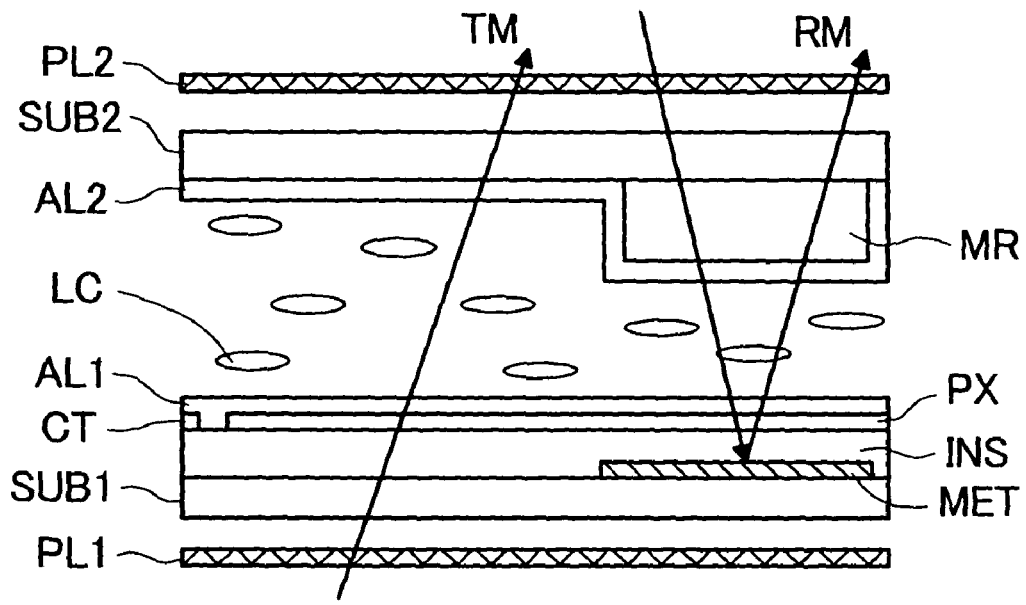
FIG. 11 is a cross-sectional view of an essential part showing the schematic constitution of 1 sub pixel of a conventional transflective liquid crystal display device.
Figure 12:
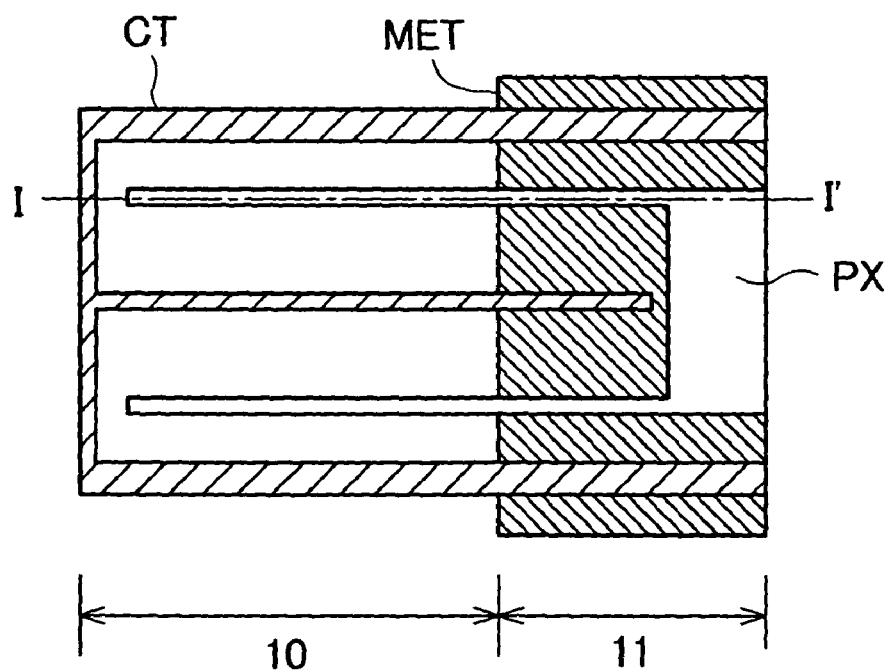
FIG. 12 is a plan view showing the electrode structure of 1 sub pixel of the conventional transflective liquid crystal display device.

FIG. 11 is a cross-sectional view of an essential part showing the schematic constitution of 1 sub pixel of a conventional transflective liquid crystal display device, while FIG. 12 is a plan view showing the electrode structure of 1 sub pixel of the conventional transflective liquid crystal display device. Here, FIG. 11 is a cross-sectional view taken along a line I-I' in FIG. 12.

As shown in FIG. 11 and FIG. 12, the conventional transflective liquid crystal display device has the substantially same constitution as the reflective liquid crystal display device of this embodiment.

Figure 13:
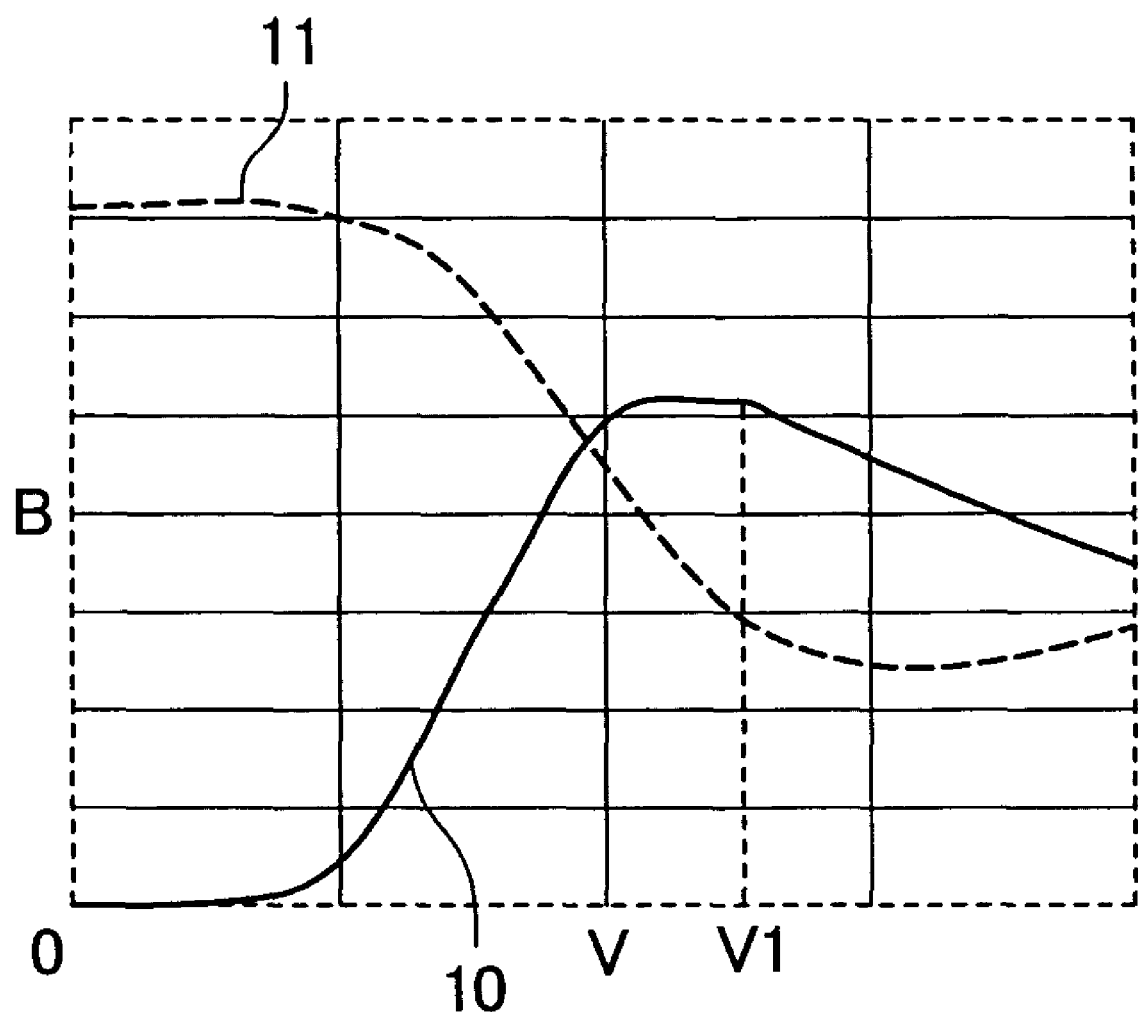
FIG. 13 is a graph showing the voltage-brightness characteristic of a transmissive portion 10 and a reflective portion 11 of the conventional transflective liquid crystal display device.

FIG. 13 is a graph showing the voltage-brightness characteristic of a transmissive portion 10 and a reflective portion 11 of the conventional transflective liquid crystal display device. In FIG. 13, a symbol V indicates a potential difference between the pixel electrodes (PX) and the counter electrodes (CT), and a symbol B indicates brightness.

As can be understood from the graph, the reflective portion 11 assumes a normally white state, that is, a state in which the reflective portion 11 performs a white display (a state in which light is emitted brightly) when a voltage is not applied to the liquid crystal layer (LC) (V=0, that is, potentials of the counter electrodes (CT) and the pixel electrodes (PX) are equal), while the transmissive portion 10 assumes a normally black state, that is, transmissive portion 10 performs a black display in which the voltage is not applied to the liquid crystal layer (LC) (V=0).

Then, when the potential difference between the pixel electrodes (PX) and the counter electrodes (CT) is increased, the transmissive portion 10 becomes brighter and the reflective portion 11 becomes darker. In this manner, the conventional transflective liquid crystal display device has a drawback that a contrast is reversed between the transmissive portion 10 and the reflective portion 11.

To the contrary, as can be readily understood by comparing FIG. 2 with FIG. 12, according to this embodiment, within 1 sub pixel, although the pixel electrodes (PX) are used in common by the transmissive portion 10 and the reflective portion 11, the counter electrodes (CT) are respectively independently provided to the transmissive portion 10 and the reflective portion 11. That is, in this embodiment, the counter electrodes (CT) are divided in two for transmissive portion and reflective portion respectively.

Here, FIG. 2 shows the constitution in which with respect to two neighboring display lines, the counter electrode (CT) of the reflective portion 11 on one display line (display line having the sub pixel indicated by symbol A in FIG. 2) and the counter electrode (CT) of the transmissive portion 10 on another display line (display line having the sub pixel indicated by symbol B in FIG. 2) are formed of a common electrode. Further, an arrow C in FIG. 2 indicates the scanning direction.

Figure 3:
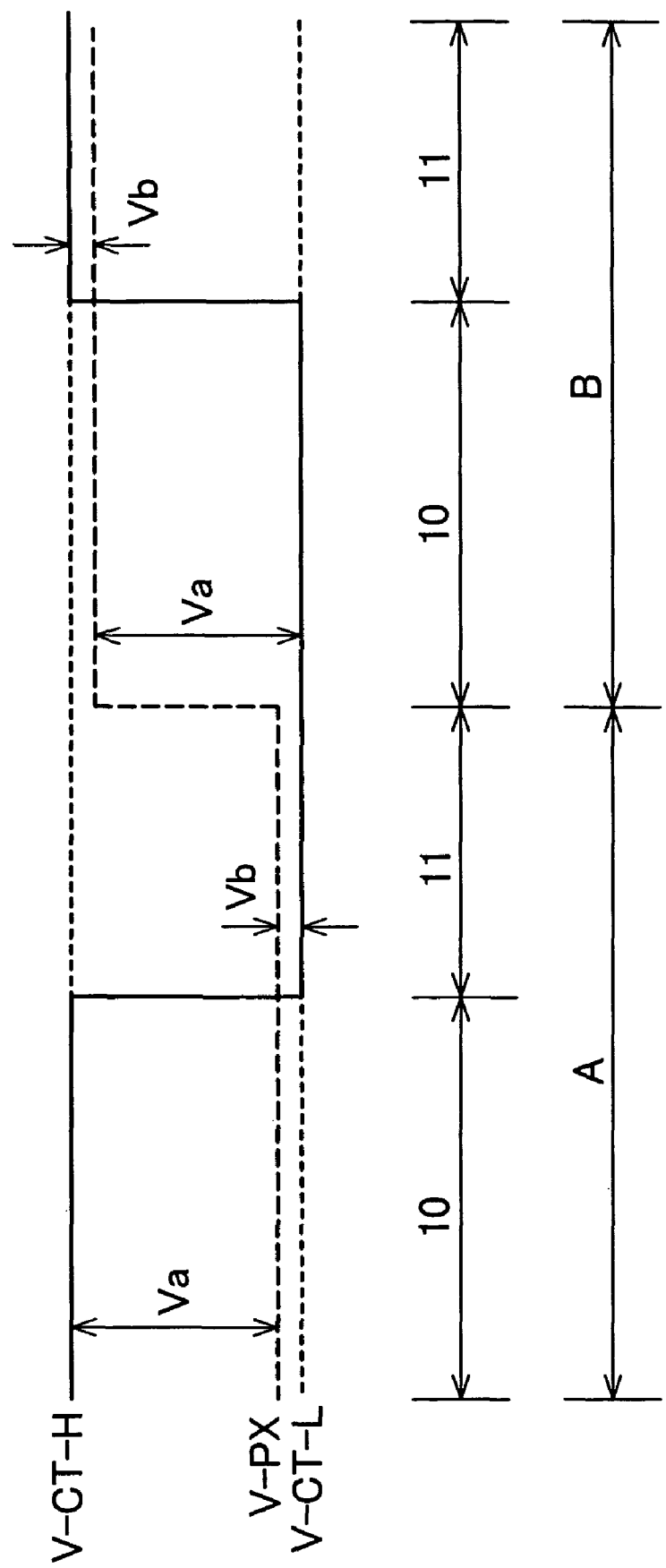
FIG. 3 is a view showing reference voltages which are applied to a counter electrode (CT) in a transmissive portion and a counter electrode (CT) in a reflective portion within the sub pixel in the transflective liquid crystal display device according to the embodiment 1 of the present invention.

Then, as shown in FIG. 3, in this embodiment, within 1 sub pixel, reference voltages which differ from each other are applied to the counter electrodes (CT) in the transmissive portion 10 and the counter electrodes (CT) in the reflective portion 11.

For example, in the sub pixel indicated by symbol A in FIG. 2, the reference voltage (V-CT-H) of High level (hereinafter referred to as H level) is applied to the counter electrodes (CT) in the transmissive portion 10, while the reference voltage (V-CT-L) of Low level (hereinafter referred to as L level) is applied to the counter electrodes (CT) in the reflective portion 11. Further, in the sub pixel indicated by symbol A in FIG. 2, a video voltage (V-PX) of negative polarity is applied to the pixel electrodes (PX) as viewed at the transmissive portion 10, while the video voltage (V-PX) of positive polarity is applied to the pixel electrodes (PX) as viewed at the reflective portion 11. Here, the negative polarity implies that a potential of the pixel electrodes (PX) is lower than a potential of the counter electrodes (CT) and is irrelevant to whether the potential of the pixel electrodes (PX) is larger or smaller than 0V or not. In the same manner, the positive polarity implies that the potential of the pixel electrodes (PX) is higher than the potential of the counter electrodes (CT) and is irrelevant to whether the potential of the pixel electrodes (PX) is larger or smaller than 0V or not.

In the same manner, in the sub pixel indicated by symbol B in FIG. 2, the reference voltage (V-CT-L) of L level is applied to the counter electrodes (CT) in the transmissive portion 10, while the reference voltage (V-CT-H) of H level is applied to the counter electrodes (CT) in the reflective portion 11. Further, in the sub pixel indicated by symbol B in FIG. 2, a video voltage (V-PX) of positive polarity is applied to the pixel electrodes (PX) as viewed at the transmissive portion 10, while the video voltage (V-PX) of negative polarity is applied to the pixel electrodes (PX) as viewed at the reflective portion 11.

Here, the video voltage (V-PX) which is applied to the pixel electrodes (PX) is a potential between the reference voltage (V-CT-H) of H level and the reference voltage (V-CT-L) of L level.

Accordingly, with respect to the sub pixels indicated by A, B in FIG. 2, the potential difference (Va in FIG. 3) between the pixel electrodes (PX) and the counter electrodes (CT) is increased in the transmissive portion 10, while the potential difference (Vb in FIG. 3) between the pixel electrodes (PX) and the counter electrodes (CT) is decreased in the reflective portion 11.

Accordingly, when the potential shown in FIG. 3 is applied, the potential difference Va between the pixel electrodes (PX) and the counter electrodes (CT) is large in the transmissive portion 10 and hence, the transmissive portion 10 becomes bright. At this point of time, the potential difference Vb between the pixel electrodes (PX) and the counter electrodes (CT) is small in the reflective portion 11 and hence, the reflective portion 11 becomes bright in the same manner.

Then, in the transmissive portion 10, when the potential of the pixel electrodes (PX) (the potential of the video signal) is changed to a value different from the potential shown in FIG. 3 so as to further increase the potential difference Va between the pixel electrodes (PX) and the counter electrodes (CT), in the reflective portion 11, the potential difference Vb between the pixel electrodes (PX) and the counter electrodes (CT) is further decreased and hence, both of the transmissive portion 10 and the reflective portion 11 become further brighter.

On the other hand, in the transmissive portion 10, when the potential of the pixel electrodes (PX) (the potential of the video signal) is changed to a value different from the potential shown in FIG. 3 so as to decrease the potential difference Va between the pixel electrodes (PX) and the counter electrodes (CT), in the reflective portion 11, the potential difference Vb between the pixel electrodes (PX) and the counter electrodes (CT) is increased and hence, both of the transmissive portion 10 and the reflective portion 11 become dark.

Figure 4:
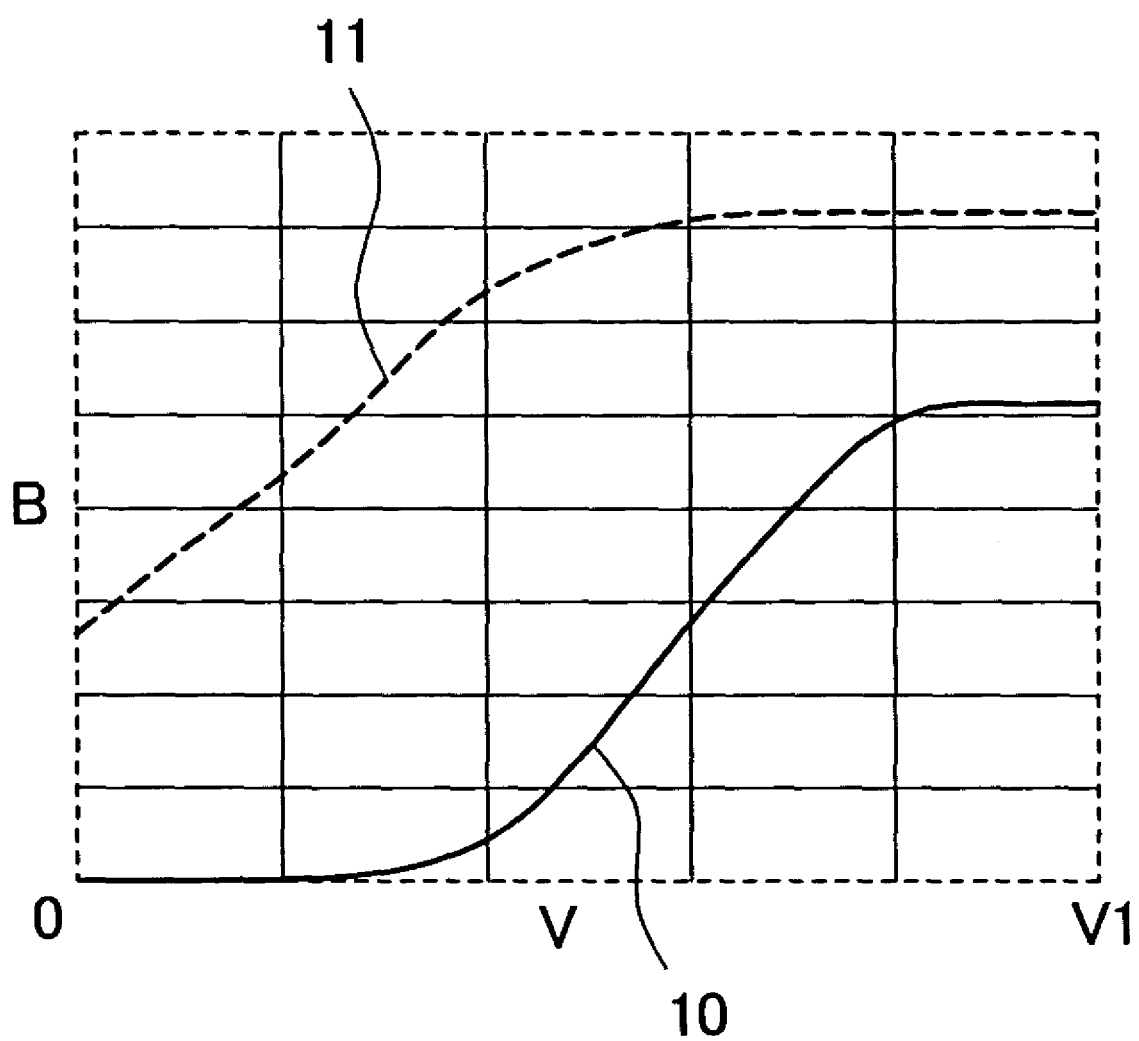
FIG. 4 is a graph showing the voltage-brightness characteristics of the transmissive portion and the reflective portion of the transflective liquid crystal display device according to the embodiment 1 of the present invention.

FIG. 4 is a graph showing the voltage-brightness characteristic of the transmissive portion 10 and the reflective portion 11 of the transflective liquid crystal display device of this embodiment. Here, in FIG. 4, a voltage V indicates a potential difference between the pixel electrodes (PX) in the transmissive portion 10 and the counter electrodes (CT) in the transmissive portion 10, and symbol B indicates brightness. In the graph shown in FIG. 4 which shows the characteristic of the transmissive portion 10, the voltage V of the transmissive portion 10 is taken on an axis of abscissas and the brightness B of the transmissive portion 10 is taken on an axis of ordinates. Here, with respect to the characteristic of the reflective portion 11, the voltage V of the transmissive portion 10 is taken on an axis of abscissas and the brightness B of the reflective portion 11 is taken on an axis of ordinates.

The characteristic of the transmissive portion 10 shown in FIG. 4 corresponds to a case in which the voltage V of the transmissive portion 10 shown in FIG. 13 is changed from 0 to V1. The characteristic of the reflective portion 11 shown in FIG. 4 corresponds to a case in which the voltage V of the reflective portion 11 shown in FIG. 13 is reversed laterally with respect to a case in which the voltage V of the transmissive portion 11 is changed from 0 to V1.

In this manner, according to this embodiment, within 1 sub pixel, the counter electrodes (CT) are divided in two, that is, are divided into the counter electrodes (CT) of the transmissive portion 10 and the counter electrodes (CT) of the reflective portion 11, the reference voltages having opposite polarities from each other (here, the opposite polarities implying that when one counter electrodes (CT) assume H level, another counter electrodes (CT) assume L level) are applied and hence, it is possible to prevent the inversion of contrast between the transmissive portion 10 and the reflective portion 11. That is, according to the present invention, even when the transmissive portion 10 assumes a normally black mode and the reflective portion 11 assumes a normally white mode, by arranging the voltage applied to the counter electrodes (CT) of the reflective portion 11, it is possible to overcome the drawback on the inversion of contrast.

Here, in performing the AC driving of the liquid crystal, it is desirable to invert the polarity of the potential applied to the counter electrodes (CT) for every predetermined frame (for example, for every 1 frame) (when the potential of H level is applied, the potential is changed to L level, while when the potential of L level is applied, the potential is changed to H level). Here, the potential of the pixel electrodes (PX) is also properly changed to acquire the predetermined brightness.

Here, as a result of a simulation, to obtain the sufficient difference in contrast in this embodiment, it is desirable to set the retardation (Δnd) of the liquid crystal layer (LC) of the reflective portion 11 to a value which satisfies 100 nm≦Δnd≦200 nm.

Further, in the IPS-type liquid crystal display device, it is difficult to apply the electric field above the pixel electrodes (PX) and hence, when the reflective portion 11 assumes the normally white mode as in the case of this embodiment, portions of the reflective portion 11 corresponding to the pixel electrodes (PX) always exhibit the white display thus giving rise to a possibility that the contrast is lowered. Further, it is also considered that similar drawback also occurs above the counter electrodes (CT) in the reflective portion 11.

Accordingly, it is desirable to adopt the following constitutions to enhance a contrast ratio of the reflective portion 11.

(1) The comb-teeth portions of at least one of or preferably both of the pixel electrodes (PX) of the reflective portion 11 and the counter electrodes (CT) of the reflective portion 11 are made of metal having low reflectance. It is desirable to set the reflectance to a value equal to or less than 70%. For example, the comb-teeth portions may be formed of Cr. Here, in place of forming the comb-teeth portions using metal having low reflectance, the reflectance may be lowered by making use of interference by adjusting a film thickness of the insulation film above the electrodes. The reflectance may be also lowered by making use of the interference by forming the electrode using a multi-layered film, by constituting an upper layer of the electrode using a transparent electrode, and by adjusting a film thickness of the transparent electrode.

(2) The comb-teeth portions of at least one of or preferably both of the pixel electrodes (PX) of the reflective portion 11 and the counter electrodes (CT) of the reflective portion 11 are made of a transparent electrode, and a reflective layer (MET) is not provided to portions of the reflective portion 11 which are overlapped to the comb-teeth portions. For example, the reflective layer (MET) has slits at positions where the slit is overlapped to the electrodes of the reflective portion 11.

(3) At positions of another substrate (SUB2) which correspond to comb-teeth portions of at least one or preferably both of the pixel electrodes (PX) of the reflective portion 11 and the counter electrodes (CT) of the reflective portion 11, light blocking films are arranged.

Figure 5:
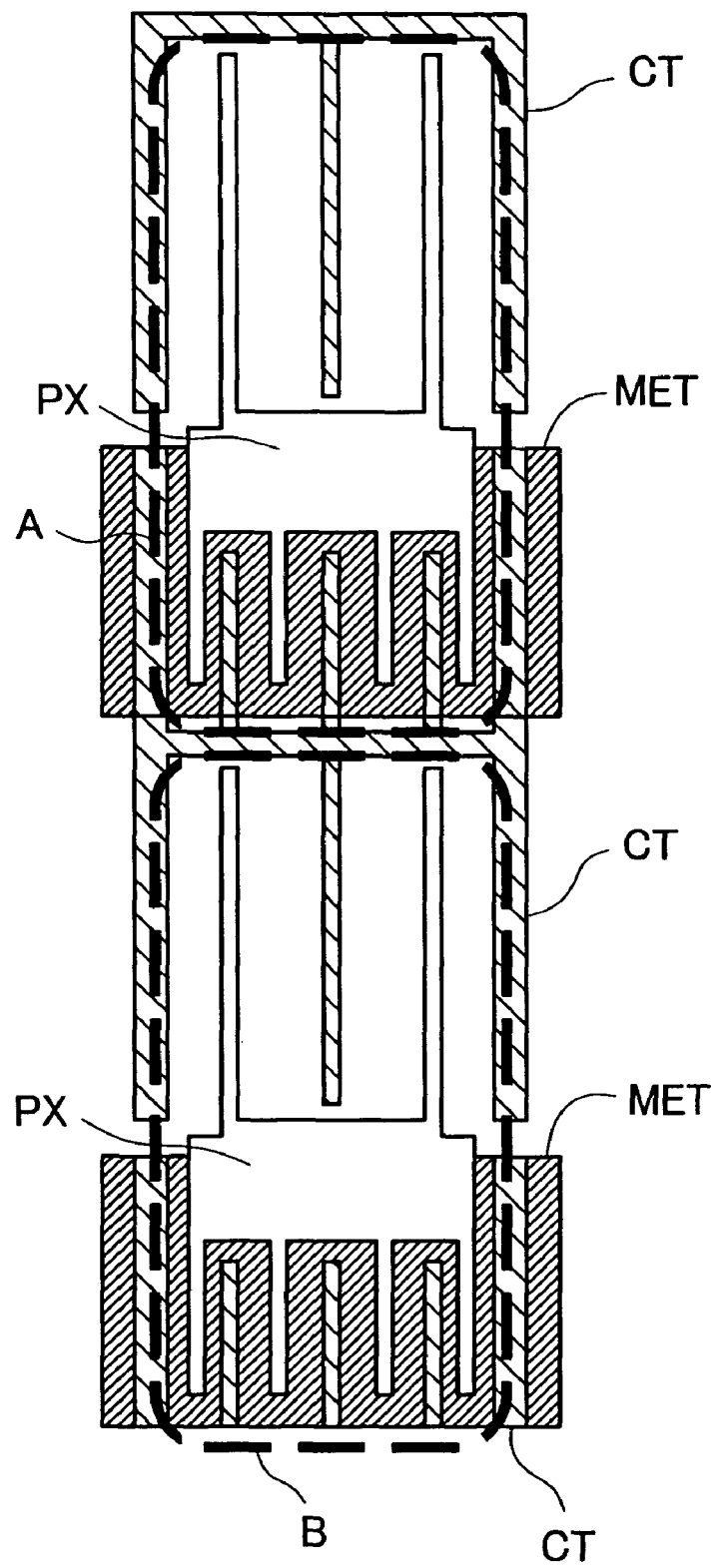
FIG. 5 is a plan view showing the electrode structure of a sub pixel of a transflective liquid crystal display device according to a modification of the embodiment 1 of the present invention.

Further, as shown in FIG. 5, by setting a distance between comb-teeth of the pixel electrodes (PX) of the reflective portion 11 and the counter electrodes (CT) of the reflective portion 11 narrower or wider than a distance between comb-teeth of the transmissive portion 10, it is possible to approximate gamma characteristic of the transmissive portion 10 and the reflective portion 11.

Here, FIG. 5 is a plan view showing the electrode structure of the sub pixel of the transflective liquid crystal display device according to a modification of the embodiment 1 of the present invention.

Embodiment 2

Figure 6:
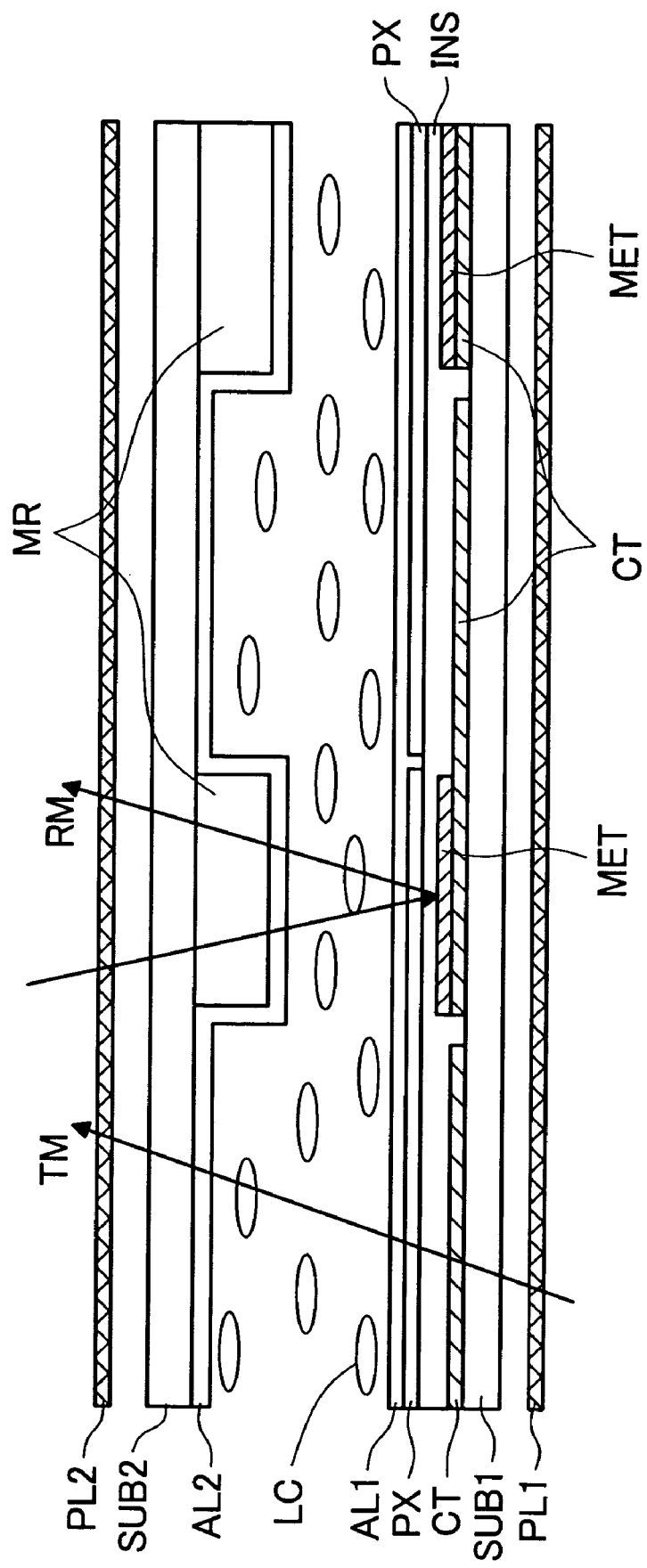
FIG. 6 is a cross-sectional view of an essential part showing the schematic constitution of a sub pixel of a transflective liquid crystal display device according to an embodiment 2 of the present invention.
Figure 7:
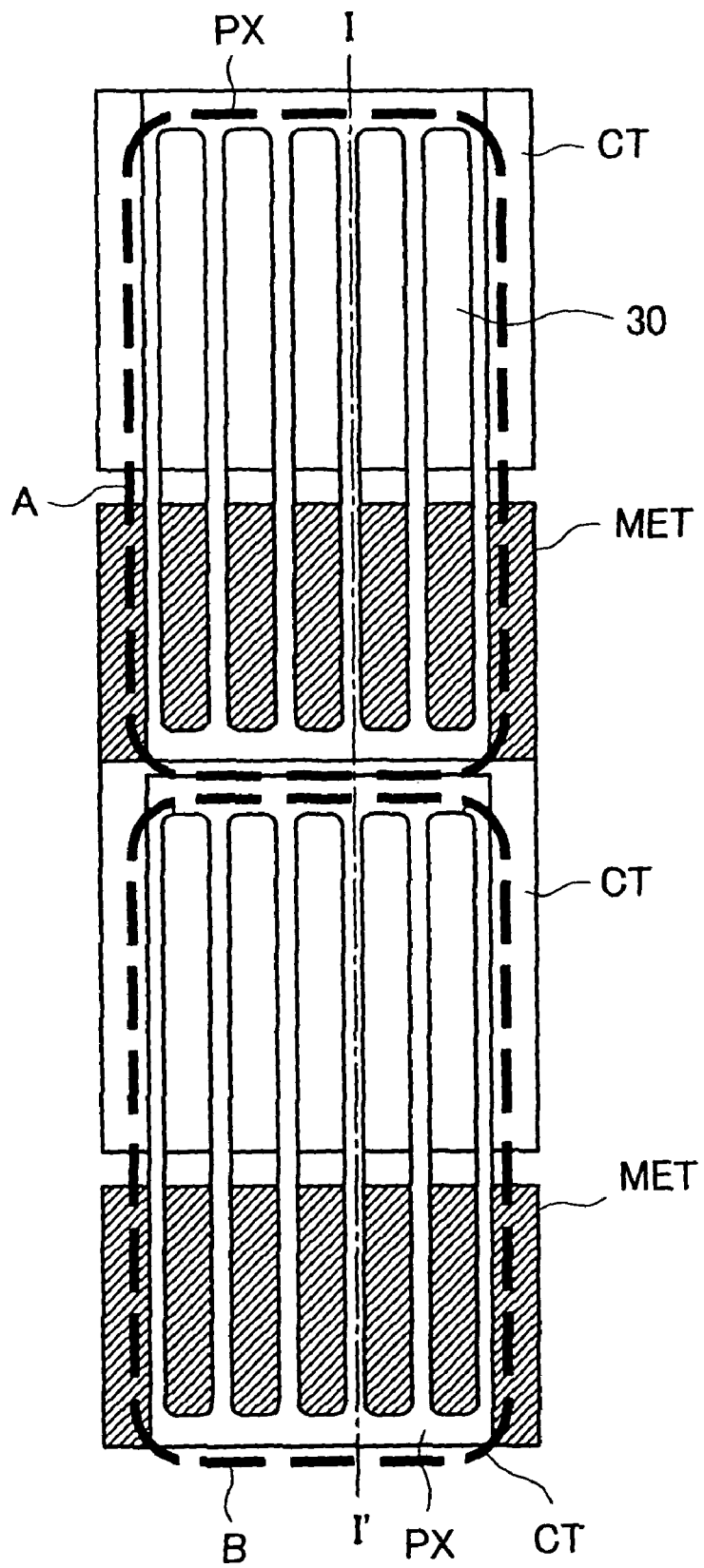
FIG. 7 is a plan view showing the electrode structure of the sub pixel of the transflective liquid crystal display device according to the embodiment 2 of the present invention.

FIG. 6 is a cross-sectional view of an essential part showing the schematic constitution of a sub pixel of a transflective liquid crystal display device according to an embodiment 2 of the present invention, and FIG. 7 is a plan view showing the electrode structure of the sub pixel of the transflective liquid crystal display device of this embodiment. Here, FIG. 6 is a cross-sectional view taken along a line I-I' in FIG. 7.

In the previously mentioned embodiment 1, the pixel electrodes (PX) and the counter electrodes (CT) in the transmissive portion 10 and the reflective portion 11 are formed on the same layer on one substrate (SUBI) and, at the same time, both of the pixel electrodes (PX) and the counter electrodes (CT) are not overlapped to each other.

On the other hand, this embodiment differs from the above-mentioned embodiment with respect to the point that the pixel electrodes (PX) and the counter electrodes (CT) of the transmissive portion 10 and the reflective portion 11 are formed on different layers on one substrate (SUB1).

In this embodiment, on the counter electrodes (CT) of the transmissive portion 10 and the reflective portion 11, an interlayer insulation film (INS) is formed and, at the same time, the pixel electrodes (PX) are formed on the interlayer insulation film (INS). Further, a reflective layer (MET) is formed on the counter electrodes (CT) of the reflective portion 11.

Further, in this embodiment, the counter electrodes (CT) of the transmissive portion 10 and the reflective portion 11 are formed in a planner shape. The pixel electrodes (PX) are formed into a rectangular shape having a slit 30 of a closed shape in the inside thereof. However, the pixel electrodes (PX) are not limited to the rectangular shape and may take an arbitrary shape.

Here, the pixel electrodes (PX) may be formed in a comb-teeth shape which has slits of a shape which opens a portion thereof in the same manner as the previously mentioned embodiment. Further, in this embodiment and previously mentioned embodiment, the pixel electrodes (PX) are configured to have linear portions.

Further, the pixel electrodes (PX) and the counter electrodes (CT) are overlapped to each other by way of the interlayer insulation film (INS) thus forming a holding capacitance therebetween. Here, the interlayer insulation film (INS) is not limited to the one-layer structure and may be formed of two or more layers.

Also in this embodiment, within 1 sub pixel, the planner counter electrodes (CT) are divided in two, that is, are divided into the counter electrodes (CT) of the transmissive portion 10 and the counter electrodes (CT) of the reflective portion 11, the reference voltages having opposite polarities from each other (here, the opposite polarities implying that when one counter electrodes (CT) assume H level, another counter electrodes (CT) assume L level) are applied and hence, it is possible to prevent the inversion of contrast between the transmissive portion 10 and the reflective portion 11.

In this case, as a result of a simulation, also in this embodiment, to obtain the sufficient contrast difference, it is desirable to set the retardation (Δnd) of the liquid crystal layer (LC) of the reflective portion 11 to a value which satisfies 100 nm≦Δnd≦200 nm.

Figure 8:
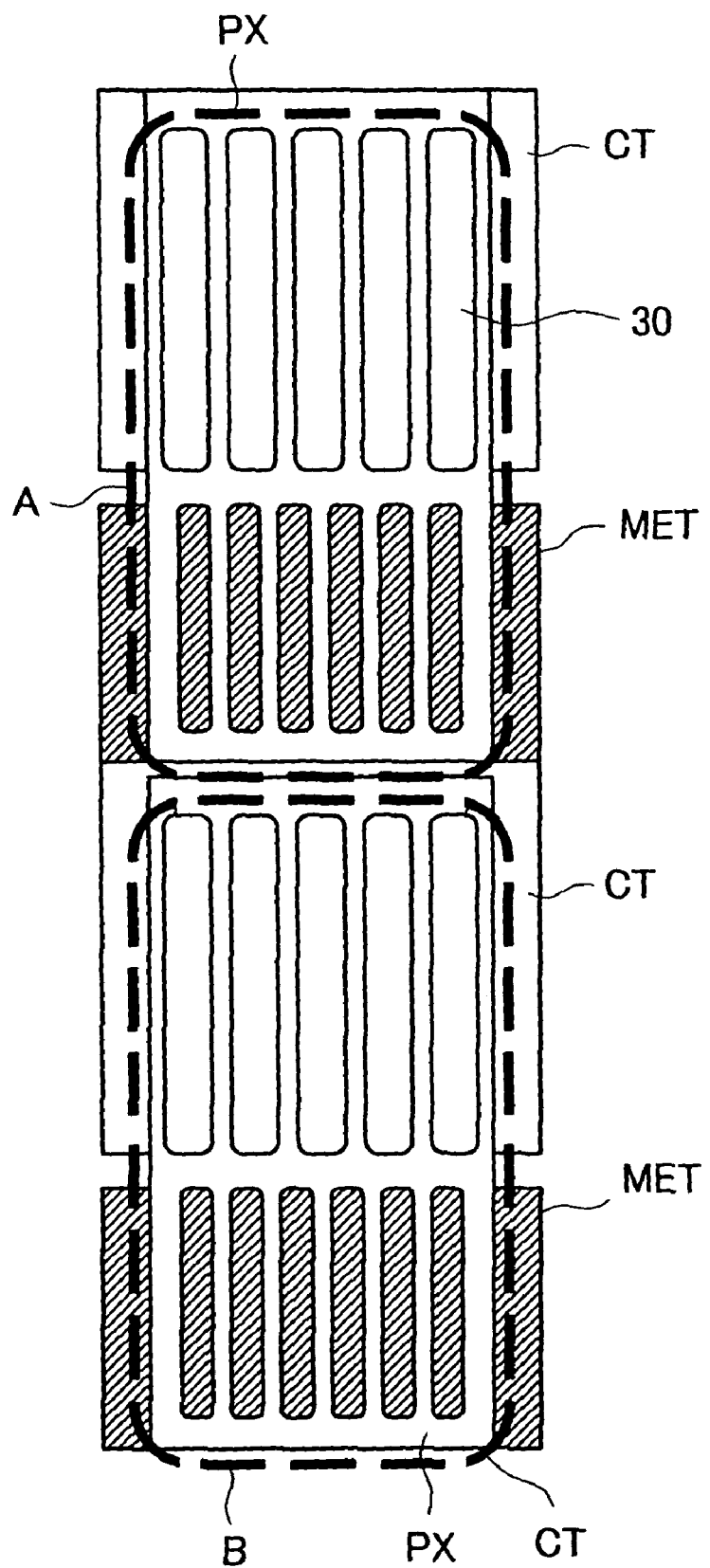
FIG. 8 is a plan view showing the electrode structure of a sub pixel of a transflective liquid crystal display device according to a modification of the embodiment 2 of the present invention.

Further, as shown in FIG. 8, by setting a distance between comb-teeth of the pixel electrodes (PX) of the reflective portion 11 narrower or wider than a distance between comb-teeth of the transmissive portion 10, it is possible to approximate gamma characteristic of the transmissive portion 10 and the reflective portion 11 to each other.

Here, FIG. 8 is a plan view showing the electrode structure of the sub pixel of the transflective liquid crystal display device according to a modification of the embodiment 2 of the present invention.

Further, in either one of this embodiment and the previously mentioned embodiment, the comb-teeth portions of the pixel electrodes (PX) and the counter electrodes (CT) may be rotated by 90°. Further, to form the pixel electrodes (PX) and the counter electrodes (CT) into a multi-domain, the pixel electrodes (PX) and the counter electrodes (CT) may have the bent structure.

Further, to enhance a contrast ratio of the reflective portion 11, it is preferable to adopt the structures (1) to (3) explained in conjunction with the embodiment 1. However, the counter electrodes (CT) do not have a comb-teeth shape in this embodiment, the structures (1) to (3) which are explained in conjunction with the embodiment 1 may be adopted with respect to the pixel electrodes (PX).

A driving method of the counter electrodes (CT) of the above-mentioned respective embodiments is explained hereinafter.

Figure 9:
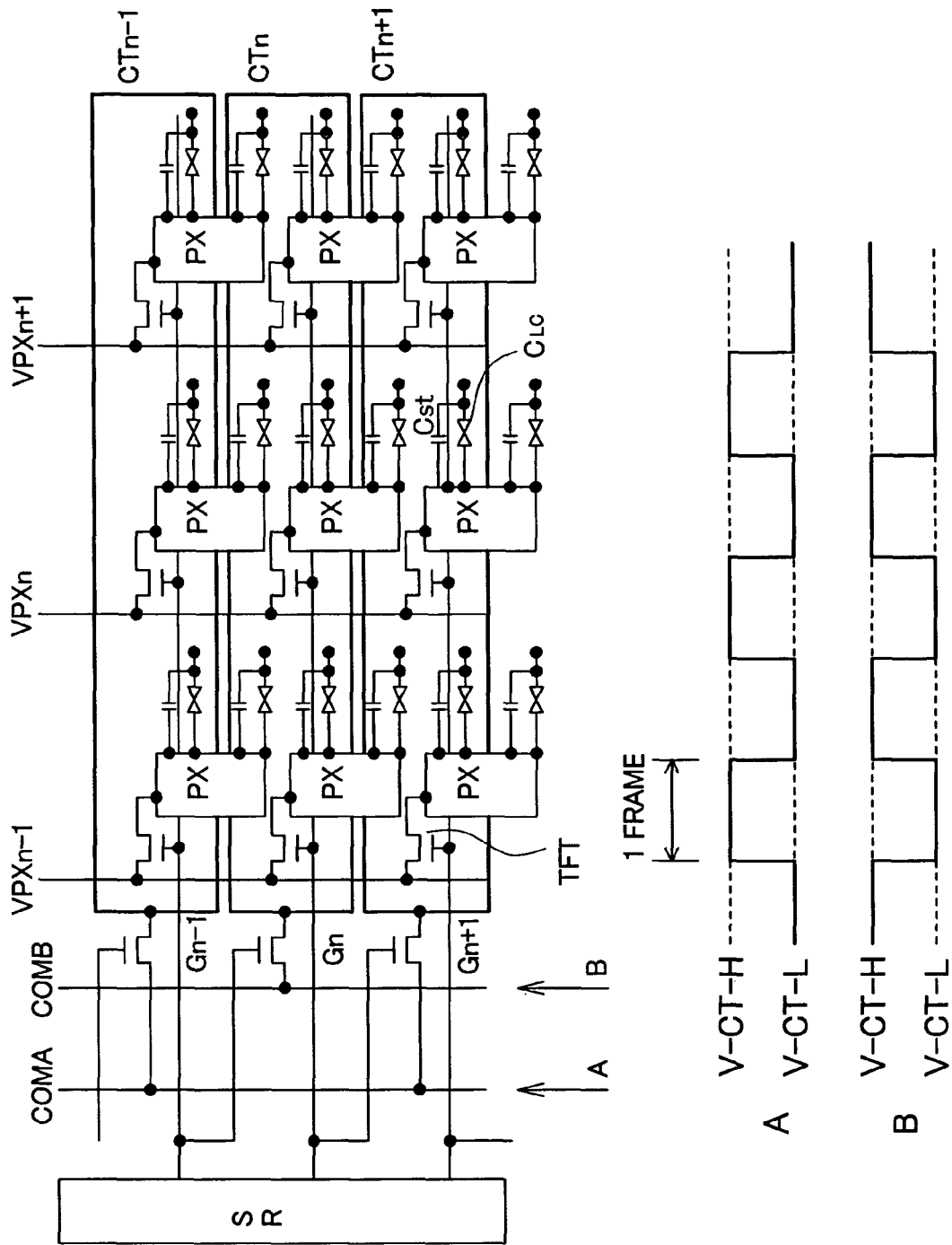
FIG. 9 is a view for explaining one example of a driving method of the transflective liquid crystal display devices of the respective embodiments of the present invention.

FIG. 9 is a view for explaining one example of the driving method of the transflective liquid crystal display devices of the respective embodiments of the present invention. Here, in FIG. 9, symbol SR indicates a shift resistor, symbols Gn−1, Gn, Gn+1 indicate scanning lines (gate lines), symbols VPXn−1, VPXn, VPXn+1 indicate video lines (drain lines or source lines), symbols CTn−1, CTn, CTn+1 indicate counter electrodes, symbols COMA, COMB indicate power source lines, symbol TFT indicates a thin film transistor, symbol CLC indicates liquid crystal capacitances, and symbol Cst indicates a holding capacitance.

In the example shown in FIG. 9, a scanning signal is applied to the scanning line (Gn−1) of the (n−1)th display line so as to turn on gates of the thin film transistors (TFT) of the respective sub pixels on the (n−1)th display line thus writing a video voltage to the pixel electrodes (PX) of the respective sub pixels via the video lines (VPXn−1, VPXn, VPXn+1) Here, the reference voltage of H level (V-CT-H) or the reference voltage of L level (V-CT-L) is applied to the counter electrodes (CTn) of the reflective portion 11 of the respective sub pixels on the (n−1)th display line and the counter electrodes (CTn) of the transmissive portion 10 of the respective sub pixels on the nth display line which is a next line from a power source line (COMB).

Next, a scanning signal is applied to the scanning line (Gn) of the nth display line so as to turn on gates of the thin film transistors (TFT) of the respective sub pixels on the nth display line thus writing a video voltage to the pixel electrodes (PX) of the respective sub pixels via the video lines (VPXn−1, VPXn, VPXn+1). Here, the reference voltage of L level (V-CT-L) or the reference voltage of H level (V-CT-H) which are reference potentials having polarities opposite to the polarities of the counter electrodes (CTn) of the 1 preceding line is applied to the counter electrodes (CTn+1) of the reflective portion 11 of the respective sub pixels on the nth display line and the counter electrodes (CTn+1) of the transmissive portion 10 of the respective sub pixels on the (n+1)th display line which is a next line from a power source line (COMA).

Due to such operations, the reference voltage of the counter electrodes (CT) of the respective sub pixels on each display line is determined.

Accordingly, when the video voltage is written in the pixel electrodes (PX) of the respective sub pixels on the nth display line, the potentials of two counter electrodes (CTn, CTn+1) in the vicinity of the pixel electrodes (PX) of each sub pixels on the nth display line are always fixed thus ensuring the stable writing.

Here, when the scanning direction assumes a direction opposite to the direction indicated by an arrow C in FIG. 2, in FIG. 9, an upper side of the pixel electrodes (PX) constitutes the reflective portion 11 and a lower side of the pixel electrodes (PX) constitutes the transmissive portion 10. Then, a scanning signal is applied to the scanning line (Gn−1) of the (n−1)th display line so as to turn on gates of the thin film transistors (TFT) of the respective sub pixels on the (n−1)th display line thus writing a video voltage to the pixel electrodes (PX) of the respective sub pixels via the video lines (VPXn−1, VPXn, VPXn+1). Here, the reference voltage of H level (V-CT-H) or the reference voltage of L level (V-CT-L) is applied to the counter electrodes (CTn) of the transmissive portion 10 of the respective sub pixels on the (n−1)th display line and the counter electrodes (CTn) of the reflective portion 11 of the respective sub pixels on the nth display line which is a next line from the power source line (COMB).

Figure 10:
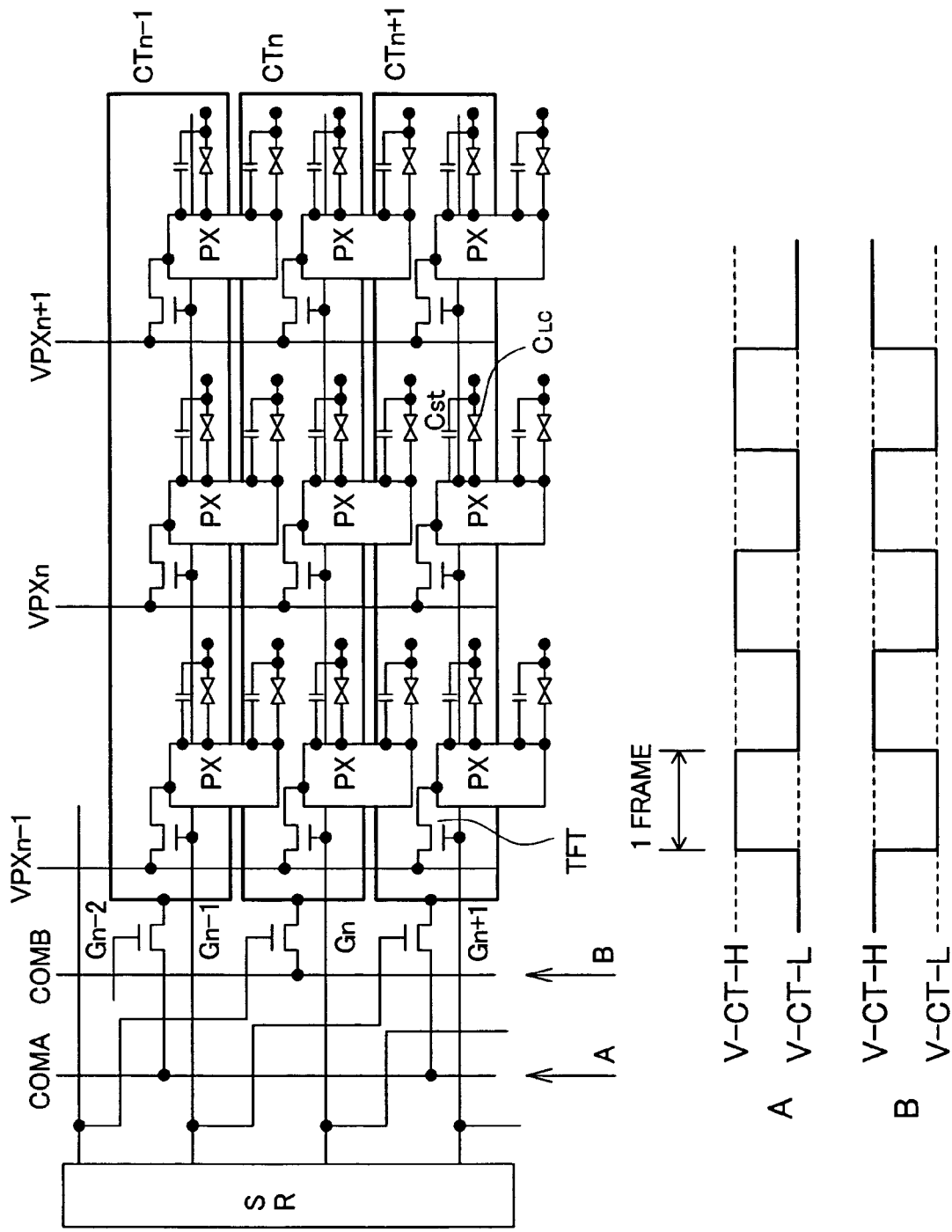
FIG. 10 is a view for explaining another example of a driving method of the transflective liquid crystal display devices of the respective embodiments of the present invention.

FIG. 10 is a view for explaining another example of a driving method of the transflective liquid crystal display devices of the respective embodiments of the present invention. Here, in FIG. 10, symbol SR indicates a shift resistor, symbols Gn−2, Gn−1, Gn, Gn+1 indicate scanning lines (gate lines), symbols VPXn−1, VPXn, VPXn+1 indicate video lines (drain lines or source lines), symbols CTn−1, CTn, CTn+1 indicate counter electrodes, symbols COMA, COMB indicate power source lines, symbol TFT indicates thin film transistors, symbol CLC indicates liquid crystal capacitances, and symbol Cst indicates holding capacitances.

In FIG. 9, in synchronism with the scanning signal applied to the scanning line (Gn) of the nth display line, the reference voltage is written in the counter electrodes (CTn) which are shared in common by the sub pixels on the nth display line and the sub pixels on the (n+1)th display line. To the contrary, this example shown in FIG. 10 differs from the example shown in FIG. 9 with respect to a point that in synchronism with a scanning signal applied to the scanning line (Gn) on the nth display line, the reference voltage is written in the counter electrodes (CTn+1) which are shared in common by the sub pixels on the (n+1)th display line and the sub pixels on the (n+2)th display line.

In the example shown in FIG. 10, gates of thin film transistors (TFT) of the respective sub pixels on the (n−1)th display line are turned on thus writing a video voltage to the pixel electrodes (PX) of the respective sub pixels. Here, the reference voltage of H level (V-CT-H) or the reference voltage of L level (V-CT-L) is applied to the counter electrodes (CTn+1) of the reflective portions 11 on the nth display line which is a next line and the counter electrodes (CTn+1) of the transmissive portions 10 of the respective sub pixels on the (n+1) display line which is a next-to-next line from the power source line (COMA). Due to such an operation, the reference voltages of the counter electrodes (CT) of the respective sub pixels on the respective display lines are decided.

Accordingly, also in the example shown in FIG. 10, when the video voltage is written in the pixel electrodes (PX), potentials of two counter electrodes (CT) in the vicinity of the pixel electrodes (PX) are always fixed thus ensuring the stable writing.

Here, when the scanning direction assumes a direction opposite to the direction indicated by an arrow C in FIG. 2, in FIG. 10, an upper side of the pixel electrodes (PX) constitutes the reflective portion 11 and a lower side of the pixel electrodes (PX) constitutes the transmissive portion 10. Then, the gates of the thin film transistors (TFT) of the respective sub pixels on the (n−1)th display line are turned on, so as to write the video voltage to the pixel electrodes (PX) of the respective sub pixels, the reference voltage of H level (V-CT-H) or the reference voltage of L level (V-CT-L) is applied to the counter electrodes (CTn+1) of the transmissive portions 10 on the nth display line which is a next row and the counter electrodes (CTn+1) of the reflective portions 11 of the respective sub pixels on the (n+1)th display line which is a next-to-next line from the power source line (COMA).

The voltages which are supplied to the power source lines (COMA) shown in FIG. 9 and FIG. 10 are expressed as waveforms (A) on lower sides of FIG. 9 and FIG. 10, while the voltages which are supplied to the power source lines (COMB) shown in FIG. 9 and FIG. 10 are expressed as waveforms (B) on lower sides of FIG. 9 and FIG. 10.

As can be understood from these voltage waveforms, the voltages supplied to the power source lines (COMA) and the voltages supplied to the power source lines (COMB) are the reference voltage of H level (V-CT-H) or the reference voltage of L level (V-CT-L), and these voltages are inverted for every frame.

Here, this embodiment adopts an inversion driving method for every 1 display line as a AC driving method and hence, in the nth display line, when the video voltage applied to the pixel electrodes (PX) assumes the positive polarity in the transmissive portion 10, the reference voltage applied to the counter electrodes (CT) in the transmissive portion 10 assumes the negative polarity (becoming the reference voltage of L level (V-CT-L)), and in the next (n+1)th display line, the video voltage applied to the pixel electrodes (PX) assumes the negative polarity in the transmissive portion 10 and hence, the reference voltage applied to the counter electrodes (CT) of the transmissive portion 10 assumes the positive polarity (reference voltage of H level (V-CT-H)).

Here, the above-mentioned patent documents 2 and 3 may be referred with respect to the detail of the inversion driving method for every 1 display line.

Although the pixel electrodes (PX) and the counter electrodes (CT) are arranged on the same layer in the embodiment 1, the pixel electrodes (PX) and the counter electrodes (CT) may be arranged on layers which are different from each other by way of the insulation film.

A back light may be arranged on a back surface of a liquid crystal display panel of the present invention.

Further, conventionally, as a means to overcome the contrast inversion characteristic shown in FIG. 13, a method which uses a phase difference plate such as a λ/4 wavelength plate or a λ/2 wavelength plate may be considered. According to the present invention, it is possible to overcome the drawback on the contrast inversion without using the phase difference plate. It is needless to say that the present invention may use the phase difference plate to compensate for coloring or the like.

The inventions which have been made by inventors of the present inventions have been specifically explained in conjunction with the embodiments, the present inventions are not limited by the above-mentioned embodiments and various modifications are conceivable without departing from the gist of the present inventions.

What is claimed is:

1. A transflective liquid crystal display device which includes a liquid crystal display panel having a pair of substrates and liquid crystal which is sandwiched between the pair of substrates,
    the liquid crystal display panel including a plurality of sub pixels each of which includes a transmissive portion and a reflective portion,
    each sub pixel of the plurality of sub pixels including a pixel electrode which is formed on one substrate out of the pair of substrates and a counter electrode which is formed on the one substrate, and
    an electric field being generated between the pixel electrode and the counter electrode thus driving the liquid crystal, wherein
    the each sub pixel is configured such that the pixel electrode is formed in common with respect to the transmissive portion and the reflective portion and the counter electrode is formed independently with respect to the transmissive portion and the reflective portion.

2. A transflective liquid crystal display device which includes a liquid crystal display panel having a pair of substrates and liquid crystal which is sandwiched between the pair of substrates,
    the liquid crystal display panel including a plurality of sub pixels each of which includes a transmissive portion and a reflective portion,
    each sub pixel of the plurality of sub pixels including a pixel electrode which is formed on one substrate out of the pair of substrates and a counter electrode which is formed on the one substrate, and
    an electric field being generated between the pixel electrode and the counter electrode thus driving the liquid crystal, wherein
    the each sub pixel is configured such that the pixel electrode is formed in common with respect to the transmissive portion and the reflective portion and the counter electrode is formed independently with respect to the transmissive portion and the reflective portion, and
    in the inside of the each sub pixel, a potential which is applied to the counter electrode of one of the transmissive portion and the reflective portion is a potential higher than a potential which is applied to the pixel electrode, and a potential which is applied to the counter electrode of another of the transmissive portion and the reflective portion is a potential lower than the potential which is applied to the pixel electrode.

3. A transflective liquid crystal display device which includes a liquid crystal display panel having a pair of substrates and liquid crystal which is sandwiched between the pair of substrates,
    the liquid crystal display panel including a plurality of sub pixels each of which includes a transmissive portion and a reflective portion,
    each sub pixel of the plurality of sub pixels including a pixel electrode which is formed on one substrate out of the pair of substrates and a counter electrode which is formed on the one substrate, and
    an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and the transmissive portion has normally-black characteristic which performs a black display in a state that a voltage is not applied, and the reflective portion has normally-white characteristic which performs a white display in a state that a voltage is not applied.

4. A transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and the counter electrodes are independently driven for every 1 display line.

5. A transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and assuming that two neighboring display lines are constituted of one display line and another display line, reference voltages which differ from each other are applied to the counter electrodes of the transmissive portions of the respective sub pixels on the one display line and the counter electrodes of the reflective portions of the respective sub pixels on the one display line, and a same reference voltage is applied to the counter electrodes of the reflective portions of the respective sub pixels on the one display line and the counter electrodes of the transmissive portions of the respective sub pixels on the another display line.

6. A transflective liquid crystal display device which includes a liquid crystal display panel having a pair of substrates and liquid crystal which is sandwiched between the pair of substrates, the liquid crystal display panel including a plurality of sub pixels each of which includes a transmissive portion and a reflective portion, each sub pixel of the plurality of sub pixels including a pixel electrode which is formed on one substrate out of the pair of substrates and a counter electrode which is formed on the one substrate, and an electric field being generated between the pixel electrode and the counter electrode thus driving the liquid crystal, wherein the each sub pixel is configured such that the pixel electrode is formed in common with respect to the transmissive portion and the reflective portion and the counter electrode is formed independently with respect to the transmissive portion and the reflective portion, and assuming that two neighboring display lines are constituted of one display line and another display line, reference voltages which differ from each other are applied to the counter electrodes of the transmissive portions of the respective sub pixels on the one display line and the counter electrodes of the reflective portions of the respective sub pixels on the one display line, a same reference voltage is applied to the counter electrodes of the reflective portions of the respective sub pixels on the one display line and the counter electrodes of the transmissive portions of the respective sub pixels on the another display line, and the counter electrodes are driven independently for every 1 display line.

7. A transflective liquid crystal display device according to claim 5, wherein the counter electrode in the reflective portion in the each sub pixel on the one display line and the counter electrode in the transmissive portion in the each sub pixel on the another display line are formed of a common electrode.

8. A transflective liquid crystal display device according to claim 1, wherein the pixel electrodes in the transmissive portion and the pixel electrodes in the reflective portion differ from each other in an interval of electrodes.

9. A transflective liquid crystal display device according to claim 1, wherein the pixel electrode in the reflective portion is made of metal which exhibits the reflectance of 70% or less.

10. A transflective liquid crystal display device according to claim 1, wherein the pixel electrode in the reflective portion is formed of a transparent electrode, the reflective portion includes a reflective film, and the reflective film has a slit at position where the slit is overlapped to the pixel electrode in the reflective portion.

11. A transflective liquid crystal display device according to claim 1, wherein another substrate out of the pair of substrates has a light blocking film at a position where the another substrate faces the pixel electrode in the reflective portion in an opposed manner.

12. A transflective liquid crystal display device according to claim 1, wherein the counter electrode is formed of a strip-like electrode, an interlayer insulation film is formed on the counter electrode of the strip-like electrode, and the pixel electrode is formed on the interlayer insulation film.

13. A transflective liquid crystal display device according to claim 1, wherein assuming n as an integer of 1 or more, in synchronism with the writing of a video voltage to the pixel electrodes in the nth display line, a same reference voltage is applied to the counter electrodes of the reflective portions in the nth display line and the counter electrodes of the transmissive portions in the (n+1)th display line.

14. A transflective liquid crystal display device according to claim 1, wherein assuming n as an integer of 1 or more, in synchronism with the writing of a video voltage to the pixel electrodes in the nth display line, a same reference voltage is applied to the counter electrodes of the transmissive portions in the nth display line and the counter electrodes of the reflective portions in the (n+1)th display line.

15. A transflective liquid crystal display device according to claim 1, wherein assuming n as an integer of 1 or more, in synchronism with the writing of a video voltage to the pixel electrodes in the nth display line, a same reference voltage is applied to the counter electrodes of the reflective portions in the (n+1)th display line and the counter electrodes of the transmissive portions in the (n+2)th display line.

16. A transflective liquid crystal display device according to claim 1, wherein assuming n as an integer of 1 or more, in synchronism with the writing of a video voltage to the pixel electrodes in the nth display line, a same reference voltage is applied to the counter electrodes of the transmissive portions in the (n+1)th display line and the counter electrodes of the reflective portions in the (n+2)th display line.

* * * * *